(12) United States Patent
Lazarus et al.

(10) Patent No.: US 10,249,440 B2
(45) Date of Patent: Apr. 2, 2019

(54) PHASE CHANGE TUNABLE CAPACITOR

(71) Applicant: U.S. Army Research Laboratory, Adelphi, MD (US)

(72) Inventors: Nathan S. Lazarus, Bethesda, MD (US); Christopher P. Migliaccio, University Park, MD (US); Iain M. Kierzewski, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 3 days.

(21) Appl. No.: 15/378,685

(22) Filed: Dec. 14, 2016

(65) Prior Publication Data
US 2018/0166220 A1 Jun. 14, 2018

(51) Int. Cl.
*H01G 7/04* (2006.01)

(52) U.S. Cl.
CPC ..................... *H01G 7/04* (2013.01)

(58) Field of Classification Search
CPC ........................................ H01G 7/04
USPC ........................................ 361/282
See application file for complete search history.

(56) References Cited

U.S. PATENT DOCUMENTS

| 3,238,428 A | 3/1966 | Kellerman |
| 4,797,692 A | 1/1989 | Ims |
| 5,162,972 A * | 11/1992 | Gripshover .......... H01G 5/0132 361/277 |
| 5,874,672 A | 2/1999 | Gerardi et al. |
| 7,158,363 B2 | 1/2007 | Beerling |
| 2004/0214543 A1 * | 10/2004 | Osone ...................... H01G 5/16 455/197.2 |
| 2004/0264107 A1 * | 12/2004 | Hunt .................... H01G 5/0132 361/327 |
| 2016/0094047 A1 * | 3/2016 | Finkenzeller ........... H02J 50/05 307/104 |

(Continued)

OTHER PUBLICATIONS

L. A. Guildner, et al., "Vapor Pressure of Water at Its Triple Point," Journal of Research of the Notional Bureau of Standards—A. Physics and Chemistry, vol. 80A, No. 3, May-Jun. 1976.

(Continued)

*Primary Examiner* — Michael P McFadden
(74) *Attorney, Agent, or Firm* — Eric Brett Compton

(57) ABSTRACT

A variable capacitor includes a substrate; a plurality of electrodes on the substrate; a phase change material on the plurality of electrodes; and a thermo-modifying element adjacent to the phase change material, wherein the thermo-modifying element changes a temperature of the phase change material. The change in temperature of the phase change material may change a capacitance between the plurality of electrodes. The thermo-modifying element may be integrated into the substrate. The thermo-modifying element may include a heater that raises a temperature of the phase change material to change from a solid state to a liquid state. The thermo-modifying element may include a layer of metal adjacent to the substrate, and wherein when electrical current flows through the layer of metal, the layer of metal forms a resistive heater and raises a temperature of the phase change material to change from a solid state to a liquid state.

6 Claims, 4 Drawing Sheets

(56) References Cited

U.S. PATENT DOCUMENTS

2016/0211230 A1* 7/2016 Lamy .................. H01L 23/528

OTHER PUBLICATIONS

B. Zalba, et al., "Review on thermal energy storage with phase change: materials, heat transfer analysis and applications," Applied Thermal Engineering, vo. 23, 2003, pp. 251-283.

S. O. Choi, et al., "A tunable capacitor using an immiscible bifluidic dielectric," Proc. 2004 IEEE MTT-S, 2004, pp. 873-876.

D. M. Herlach et al., "Nucleation and phase-selection in undercooled melts," Materials Science and Engineering: A, vol. 375-377, 9-15, 2004.

A. L. Lacaita et al., "Electrothermal and phase-change dynamics in chalogenide-based memories," IEEE Electron Devices Meeting, 2004, 911-914.

X.G. Tang, et al., "Diffuse phase transition and dielectric tunability of $Ba(Zr_yTi_{1-y})O_3$ relaxor ferroelectric ceramics," Acta Materialia 52 (2004) 5177-5183.

A. Fabbri, et al. "Dielectric capacity, liquid water content and pore structure of thawing-freezing materials," Cold Regions Science and Technology, vol. 44, Issue 1, 2006, pp. 52-66.

Zheng, et al., "Reversible temperature regulation of electrical and thermal conductivity using liquid-solid phase transitions," Nature Communications, vol. 2, 289, 2011.

\* cited by examiner

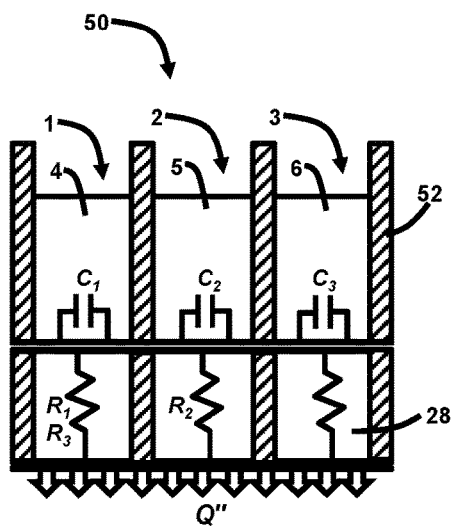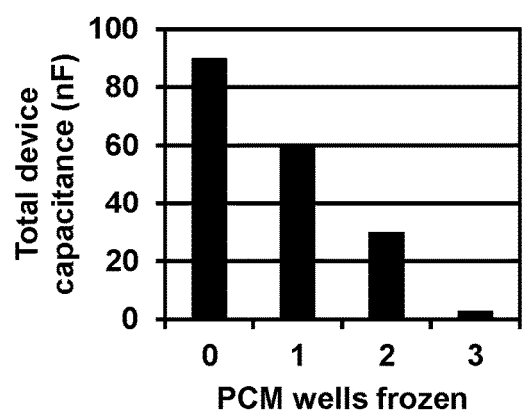
FIG. 4A
FIG. 4B

PHASE CHANGE TUNABLE CAPACITOR

GOVERNMENT INTEREST

The embodiments herein may be manufactured, used, and/or licensed by or for the United States Government without the payment of royalties thereon.

BACKGROUND

Technical Field

The embodiments herein generally relate to electronic devices, and more particularly to phase change materials used in electronic devices.

Description of the Related Art

Phase change materials (PCMs) have been used in industrial applications for decades, most commonly as a means of thermal storage or thermal protection. PCMs are also used as storage devices for solar energy. During the daylight hours, energy is transferred to the PCM, which absorbs thermal energy as solid PCM material melts. During the nighttime, liquid PCM solidifies, which releases the stored energy. Similar systems are used for environmental control in buildings, automobiles, space vehicles, and food/perishables storage containers. As a thermal protection mechanism, PCMs absorb thermal load spikes, protecting devices from loads in excess of designed capacity. Electronic devices integrate PCMs such that when a power spike occurs beyond what the thermal management system is designed for, the PCM absorbs the impulse, providing a thermal buffer thus preventing damage or failure of the device. Similar configurations are used in food processing, environmental control of buildings and vehicles, and waste heat recovery of vehicle exhaust and industrial processes. Another relatively new application for PCMs is as a mechanism of nonvolatile memory to store information.

SUMMARY

In view of the foregoing, an embodiment herein provides a variable capacitor comprising a substrate; a plurality of electrodes on the substrate; a phase change material on the plurality of electrodes; and a thermo-modifying element adjacent to the phase change material, wherein the thermo-modifying element changes a temperature of the phase change material. The change in temperature of the phase change material may change a capacitance between the plurality of electrodes. The thermo-modifying element may be integrated into the substrate or adjacent to the substrate. The thermo-modifying element may comprise a heater that raises a temperature of the phase change material to change from a solid state to a liquid state. The thermo-modifying element may comprise a layer of metal adjacent to the substrate or in proximity to the substrate, and wherein when electrical current flows through the layer of metal, the layer of metal forms a resistive heater and raises a temperature of the phase change material to change from a solid state to a liquid state. The thermo-modifying element may comprise a cooling component that lowers a temperature of the phase change material to below a freezing point of the phase change material. The variable capacitor may further comprise a well structure adjacent to and confining the phase change material. The phase change material may comprise any of water, salt water, erythritol, and sorbitol. The variable capacitor may further comprise a nucleation agent that triggers a transition of the phase change material from the liquid state back to the solid state. The variable capacitor may further comprise a device that triggers the nucleation agent. The nucleation agent may comprise any of mechanical agitation, acoustic waves, electrical, magnetic or optical excitation, heat/cooling pulse, chemical triggering, and bubble formation.

Another embodiment provides a variable capacitor comprising a substrate; a plurality of electrodes on the substrate; a phase change material on the plurality of electrodes; and a thermo-modifying element, wherein the thermo-modifying element causes a change in a dielectric constant of the phase change material. The thermo-modifying element may comprise any of a heater that raises a temperature of the phase change material to change from a solid state to a liquid state; a layer of metal adjacent to the substrate, and wherein when electrical current flows through the layer of metal, the layer of metal forms a resistive heater and raises a temperature of the phase change material to change from a solid state to a liquid state; and a cooling component that lowers a temperature of the phase change material to below a freezing point of the phase change material.

Another embodiment provides a variable capacitor device comprising a substrate; a plurality of insulated wells on the substrate; a plurality of capacitors on the substrate, wherein each well of the plurality of insulated wells contains a phase change material; and a plurality of thermal resistance components that cause a change in a dielectric constant of the phase change material in each insulated well. The plurality of insulated wells may comprise a different phase change material from one another that are configured to freeze at a different temperature from one another. Each well of the plurality of wells may correspond to a unique thermal resistance component of the plurality of thermal resistance components. A thermal resistance of the plurality of thermal resistance components may be equal. The plurality of capacitors may be connected in parallel. The plurality of insulated wells may comprise a same phase change material as each other that are configured to freeze at a different temperature from one another. A thermal resistance of the plurality of thermal resistance components may be unequal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4A is a schematic diagram of a PCM temperature compensation variable capacitor according to an embodiment herein; and FIG. 4B is a graphical representation illustrating the device capacitance according to an embodiment herein.

DETAILED DESCRIPTION

Figure 1:
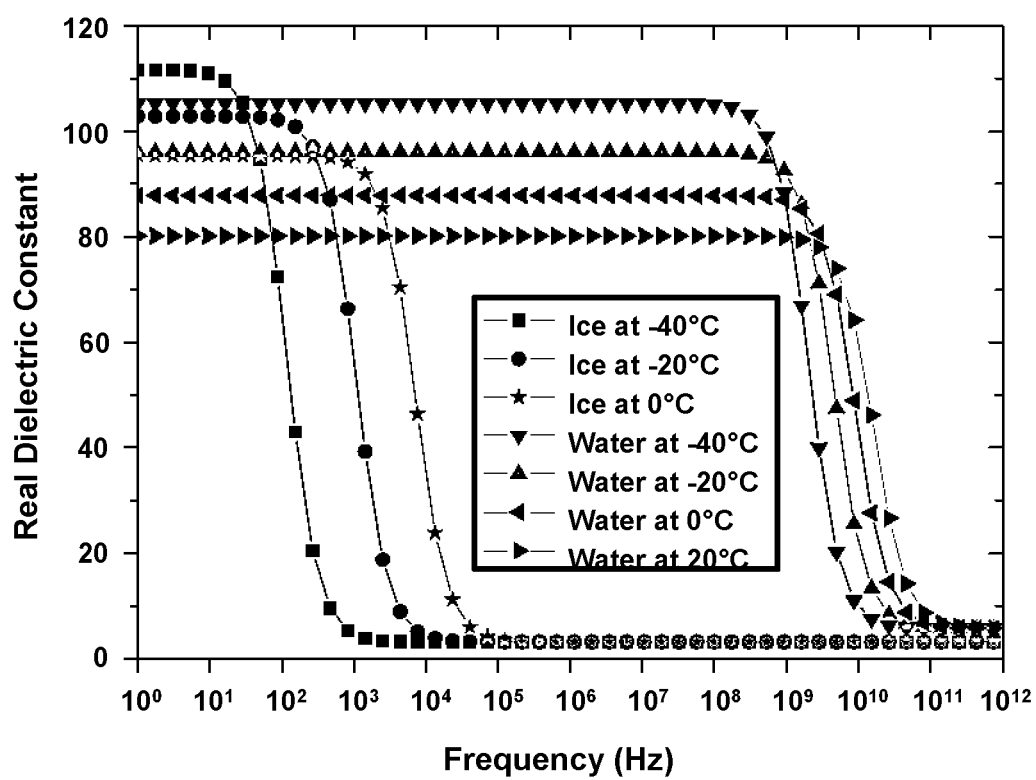
FIG. 1 is a graphical representation illustrating the dielectric constant of water/ice.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a capacitor filled or coated with a material with a low melting point. When the temperature of the device is brought beyond the melting point causing the filed or coated material to melt, either due to changes in the surrounding environment or due to use of an incorporated heater element, a sizeable change in the dielectric constant of the filling or coating material, and therefore the overall capacitance of the device, occurs. A further aspect of the embodiments herein is the use of supercooling, which maintains the liquid state of fluids below the freezing point, to maintain the capacitance with zero additional holding power. Referring now to the drawings, and more particularly to FIGS. 1 through 4B, where similar reference characters denote corresponding features consistently throughout the figures, there are shown preferred embodiments.

Many liquids, particularly highly polar ones such as water, experience a very large shift in the dielectric constant in some frequency bands when transitioning from liquid to solid. Above a few hundred Hz, water drops in dielectric constant by close to a factor of ten as it solidifies to become ice. The embodiments herein utilize this concept in creating a very large capacitance change in a variable capacitor for only a moderate addition of energy to transition over the phase boundary.

According to the embodiments herein, a phase change is used for creating a tunable electrical component; namely a capacitor. For a given configuration, the capacitance is proportional to the relative permeability of the surrounding medium. Like many material properties, the relative permeability, or dielectric constant, of an electrically insulating material varies with temperature. The physical structure in particular has a sizeable effect, influencing how easily the material can be polarized by an applied electric field. As a result, a very large step in the dielectric constant value can occur at the solid-liquid phase transition boundary, with the resulting abrupt change in physical structure. The best known example of this occurs with water. A highly polar molecule, water has a dielectric constant of roughly 80 at room temperature, and slightly higher at 0° C. When it freezes, the static (low frequency) dielectric constant is similar for ice. However, the speed of response to changes in voltage across the material, known as the relaxation time, is very different between the two phases; this means that, for higher frequencies, the dielectric constant is very different. Above approximately 10 kHz, the dielectric constant for ice is dramatically lower than that of water, dropping from 90 to only about 4 as shown in FIG. 1 and further described in Fabbri, A., et al. "Dielectric capacity, liquid water content and pore structure of thawing-freezing materials," Cold Regions Science and Technology, Vol. 44, Issue 1, 2006, pp. 52-66, the complete disclosure of which, in its entirety, is herein incorporated by reference. With many situations in both power matching and RF communications occurring at higher frequencies (10's to 100's of kHz for power, MHz to GHz for RF), this effect can be exploited to obtain a very high tuning ratio for a variable capacitor.

Figure 2A:
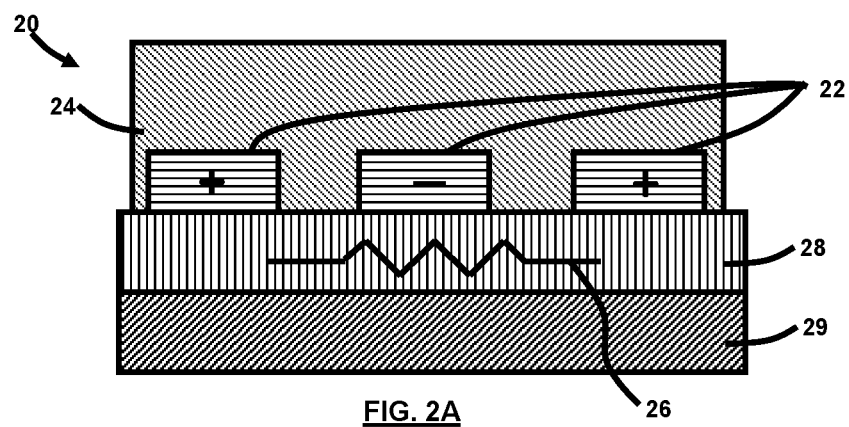
FIG. 2A is a schematic diagram of a phase change variable capacitor according to an embodiment herein.
Figure 2B:
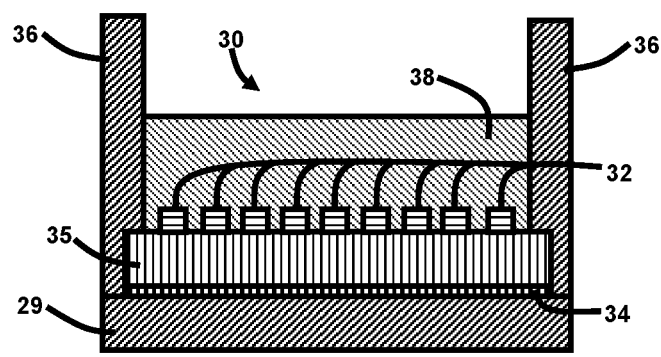
FIG. 2B is a schematic diagram of a phase change variable capacitor after an erythritol fill according to an embodiment herein.

FIG. 2A illustrates a variable capacitor 20 based on the dielectric constant change across the phase boundary according to an embodiment herein. It illustrates a set of metal electrodes 22 coated with a PCM 24 with a low melting point. A wide range of coating methods could be used in accordance with the embodiments herein. A non-limiting exemplary embodiment of the coating process includes drop casting (i.e., putting drops on the set of metal electrodes 22) or dip coating (i.e., dipping the set of metal electrodes 22 in a solution). This could include chemical vapor deposition, atomic layer deposition, reactive and non-reactive sputtering, thermal or e-beam evaporation, oxidation, etc. and is further dependent on the type of material that is desired. The melting point can vary widely based on the application. For example, erythritol melts at 121° C., water and water based solutions melt at 0° C. and lower, but with active control melting points ranging from −100° C. to 1000° C. are possible, if not a wider range potentially. An integrated heater element, such as a heater resistor 26 is used to heat (e.g., erythritol melts at 121° C.) the substrate 28 and melt the PCM 24, creating a change in the dielectric constant of the PCM 24 and resulting capacitance between the metal electrodes 22. The substrate 28 could include glass, which is thermally stable to approximately 1500° C. Alternatively, the substrate 28 could include a semiconductor such as silicone, which is thermally stable to approximately 200° C. and thus it is not damaged during the heating process. FIG. 2B illustrates a further implementation of the embodiments herein where approximately 10 μm thick copper electrodes 32 form a capacitor 30 on one side of an approximately 500 μm thick PYREX® chip 35, and a thin (e.g., approximately 50-100 μm thick) metal layer 34 (i.e., titanium, etc.) is sputtered on the back to form a resistive heater. A molded silicone well 36 comprising approximately 5 mm thick walls, is used to contain the PCM 38; e.g., erythritol (which is a common non-sugar sweetener). In another embodiment, a thermoelectric or other cooling element, such as thermal grease, can also be used to instead cool the phase change material 38 below its freezing point for a similar effect.

Another embodiment is based on a phenomenon experienced in fluids known as supercooling. Fluids do not instantaneously solidify when the freezing point is reached; for a moderate temperature range the material solidifies only with the presence of nucleation sites such as bubbles, particulate, or already solidified material. In a fluid lacking in nucleation sites, the fluid can be kept in the liquid phase down to the crystal homogenous nucleation temperature (for example, −48° C. for water, with freezing point of 0° C.). Some fluids can be brought even further below their nominal freezing point. Erythritol (melting point 121° C.) can be consistently brought down to below 60° C.

Figure 3A:
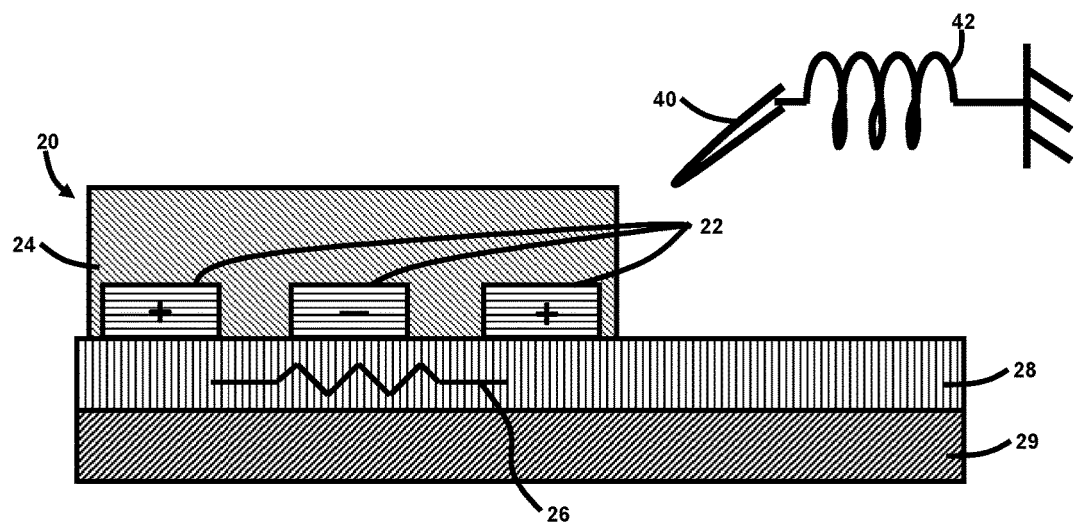
FIG. 3A is a schematic diagram of a phase change variable capacitor based on supercooling and triggering according to an embodiment herein.
Figure 3B:
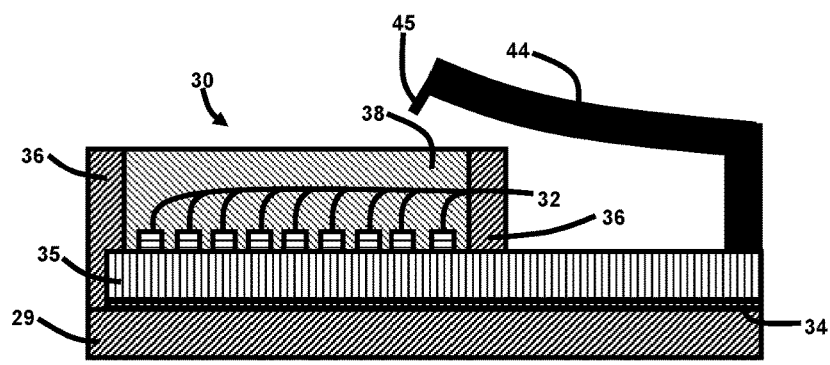
FIG. 3B is a schematic diagram of a phase change variable capacitor with a microelectromechanical system (MEMS) piezoelectric bimorph for triggering the phase change according to an embodiment herein.

One aspect of the embodiments presented in FIGS. 2A and 2B is that the temperature should be maintained above or below the phase boundary by active heating or cooling. Since the tuning ratio is large (a maximum of roughly 30:1 for water), there may be applications where these power losses are justified. FIGS. 3A and 3B illustrate embodiments of achieving a similar effect as FIGS. 2A and 2B without large holding power (i.e., lower the power consumption). If the capacitor is in the supercooling temperature region, it is possible to hold the phase change material in either state, without any additional power beyond that necessary to trigger the phase change. Supercooling is possible until the temperature where crystal homogeneous nucleation occurs; with water it is approximately −48° C. (i.e., 48° C. lower than it's 'freezing point'). With erythritol, this supercooling temperature range extends for tens of degrees below the nominal "freezing" point. In the embodiment in FIG. 3A, multiple mechanisms are used to trigger the two phase conditions: a built in heater 26 is used to heat the device 20 above the melting point for a transition from solid to liquid, while a mechanical injector, agitator, or needle 40, which is actuated by a mechanical actuator or spring 42, is used to mechanically trigger the phase transition back from liquid to solid. FIG. 3B shows a specific embodiment using a MEMS piezoelectric bimorph device 44 to physically agitate the PCM 24. Possible nucleation methods include mechanical agitation, acoustic waves, electrical, magnetic or optical excitation, heat/cooling pulse, chemical triggering, or bubble formation. This solidification could include either agitation to cause bubbles and the resulting nucleation sites or already solidified material on the mechanical probe 45.

In another embodiment shown in FIG. 4A, a temperature compensation variable capacitor device 50 is provided comprising of a set of distinct PCM wells 1, 2, 3, each surrounded by insulated walls 52, and each of the PCM wells 1, 2, 3 configured to freeze at a different temperature such that the capacitors $C_1$, $C_2$, and $C_3$ may be operated in several configurations. In FIG. 4A, capacitors $C_1$, $C_2$, and $C_3$ are represented by the combination of PCM materials 4, 5, 6 with electrodes (not shown in FIG. 4A, but which are similarly configured to the electrodes 22 of FIG. 2A) over the substrate 28. In the first case, the PCM wells 1, 2, 3 are filled with different phase change materials 4, 5, 6 having varied freezing points; e.g., $T_{f,1}>T_{f,2}>T_{f,3}$, while the thermal resistances $R_1$, $R_2$, $R_3$ are equal. Examples of the different types of phase change materials that may be used include, but are not limited to, water, salt water, some sugars (e.g., erythritol, sorbitol), as well as other materials that are suitably non-conductive and meltable. As heat Q″ is extracted from the device 50, the temperature of the PCM materials falls. PCM well 1 freezes first, thus the capacitance in that well ($C_1$) drops. As described above, PCMs such as water exhibit dielectric constant changes of up to 30:1 when phase change occurs, thus if $C_1$=30 nF when PCM well 1 is liquid, it will shift to 1 nF when well 1 solidifies. If $C_1$, $C_2$, and $C_3$ are connected in parallel, the effect on total device capacitance is shown in FIG. 4B. As the temperature of the device 50 continues to fall, PCM wells 1 and 2 freeze, and the overall device capacitance reaches a minimum "frozen device capacitance." This temperature difference from well to well can be accomplished by varying a mixture of two liquids, such as ethylene glycol and water, to tune the melting points of the mixture.

In an alternative embodiment, a single PCM material (either 4, 5, or 6, for example, or PCM material 4, 5, 6 is the same) fills all three wells 1, 2, 3, and the thermal resistances are designed such that $R_1<R_2<R_3$. As heat Q″ is extracted from the device 50, the temperature in the wells 1, 2, 3 falls; however, the temperature drops faster in well 1 due to the lower thermal resistance path under that well 1. The resulting device capacitance as the wells freeze is the same as the first case.

The embodiments herein contain a passive temperature sensing mechanism as compared to the conventional devices, so the embodiments herein are ideal for temperature compensation, for instance for load matching or removing temperature effects from other types of sensors. There is also a possibility of using this phase change capacitor effect for more direct sensing (for instance, detecting particulate or physical shock). Most alternative methods are based on active control to measure and adapt to changes in the load. The variable capacitor 20, 30, 50 provided by the embodiments herein has a relatively slow switching speed, but high tuning ratio, compared with other alternative techniques of capacitor tuning.

Variable capacitors are used widely in radio frequency (RF) communication devices (for shifting between channels and bands) and power (for load matching), both with numerous military and commercial applications. The embodiments herein provide a solution that is relatively low speed, but with very large possible change at little added power, and could be utilized as a passive or nearly passive compensation technique (for instance, in a power system with changes in load with temperature, a bank of these capacitors shifting at different temperatures could passively power match with no additional input from the user or control system). Since power loads in almost all applications do vary in behavior with temperature (and since compensating for this change is one of the main goals of tunable load matching networks), a passive technique such as the one provided by the embodiments herein could be used widely in many power systems for electronics.

The embodiments herein provide a capacitor 20, 30, 50 filled or coated with a PCM 24, 38 with a low melting point. When the temperature of the device 20, 30, 50 is brought beyond the melting point, either due to changes in the surrounding environment or due to use of an incorporated heater element 26, a sizeable change in the dielectric constant of the filling or coating (e.g., PCM 24, 38) occurs, and therefore a change in the overall capacitance occurs. A further aspect of the embodiments herein is the use of supercooling, a tendency in fluids to maintain liquid state below the freezing point, to maintain the capacitance with zero additional holding power. This is accomplished by using a heat spike to melt, or a mechanical trigger 40, 42 to freeze, within this range, with a stable value from each phase possible in this temperature range. The device is envisioned as a variable capacitor 20, 30, 50 with a built-in temperature sensor capability (i.e., the capacitance is changing with temperature), for applications such as temperature compensation in power load matching.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A variable capacitor device comprising:
   a substrate;
   a plurality of insulated wells on said substrate;
   a plurality of capacitors on said substrate, wherein each well of said plurality of insulated wells contains a phase change material; and
   a plurality of thermal resistance components that cause a change in a dielectric constant of the phase change material in each insulated well,
   wherein the phase change materials in each of the plurality of insulated wells are configured to have different phase change properties.

2. The variable capacitor device of claim 1, wherein said plurality of insulated wells comprise a different phase change material from one another that are configured to freeze at a different temperature from one another.

3. The variable capacitor device of claim 1, wherein each well of said plurality of wells corresponds to a unique thermal resistance component of said plurality of thermal resistance components.

4. The variable capacitor device of claim 3, wherein a thermal resistance of said plurality of thermal resistance components is equal.

5. The variable capacitor device of claim 1, wherein said plurality of capacitors are connected in parallel.

6. The variable capacitor of claim 1, wherein said plurality of insulated wells comprise a same phase change material as each other and the plurality of thermal resistance components in the wells have different thermal resistance values so that the same phase change materials in the wells are configured to freeze at a different temperature from one another.

* * * * *